(12) United States Patent
Olim et al.

(10) Patent No.: US 6,747,841 B1
(45) Date of Patent: Jun. 8, 2004

(54) OPTIMIZATION OF TEMPERATURE DEPENDENT VARIATIONS IN SHIELD AND POLE RECESSION/PROTRUSION THROUGH USE OF A COMPOSITE OVERCOAT LAYER

(75) Inventors: Moshe Olim, Eden Prairie, MN (US); Ladislav R. Pust, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 228 days.

(21) Appl. No.: 09/843,215

(22) Filed: Apr. 25, 2001

Related U.S. Application Data

(60) Provisional application No. 60/230,402, filed on Sep. 6, 2000.

(51) Int. Cl.⁷ .................................................. G11B 21/21
(52) U.S. Cl. ...................................... 360/126; 360/235.1
(58) Field of Search .................................. 360/126, 317, 360/234.7, 236.5, 235.1

(56) References Cited

U.S. PATENT DOCUMENTS

| | | | |
|---|---|---|---|
| 4,853,810 A | 8/1989 | Pohl et al. ................ 360/234.7 |
| 5,021,906 A | 6/1991 | Chang et al. ............. 360/235.1 |
| 5,083,365 A * | 1/1992 | Matsumoto ............... 29/603.12 |
| 5,283,942 A | 2/1994 | Chen et al. ................... 29/603 |
| 5,303,105 A | 4/1994 | Jorgenson ................. 360/294.3 |
| 5,377,058 A | 12/1994 | Good et al. .................... 360/75 |
| 5,452,164 A | 9/1995 | Cole et al. .................... 360/317 |
| 5,473,486 A * | 12/1995 | Nepela et al. ............. 360/234.7 |
| 5,636,088 A | 6/1997 | Yamamoto et al. ...... 360/245.1 |
| 5,640,753 A | 6/1997 | Schultz et al. ............ 29/603.08 |
| 5,663,856 A | 9/1997 | Packard ...................... 360/122 |
| 5,687,045 A * | 11/1997 | Okai et al. ................... 360/126 |
| 5,710,683 A | 1/1998 | Sundaram .................... 360/126 |
| 5,771,570 A | 6/1998 | Chhabra et al. .......... 29/603.06 |
| 5,793,207 A | 8/1998 | Gill ............................. 324/252 |
| 5,896,243 A | 4/1999 | Koshikawa et al. ..... 360/234.6 |
| 5,896,244 A | 4/1999 | Watanabe et al. ........ 360/234.6 |
| 5,898,106 A * | 4/1999 | Babcock et al. .............. 73/105 |
| 5,898,542 A | 4/1999 | Koshikawa et al. ..... 360/234.7 |
| 5,909,340 A | 6/1999 | Lairson et al. ........... 360/237.1 |
| 5,949,627 A | 9/1999 | Williams et al. ............ 360/126 |
| 5,963,401 A * | 10/1999 | Dee et al. .................... 360/316 |
| 5,991,113 A | 11/1999 | Meyer et al. .................. 360/75 |
| 6,074,566 A | 6/2000 | Hsiao et al. ..................... 216/2 |
| 6,078,455 A | 6/2000 | Enarson et al. ............... 360/68 |
| 6,130,809 A * | 10/2000 | Santini ........................ 360/317 |
| 6,154,952 A | 12/2000 | Tangren ................... 29/603.04 |
| 6,212,040 B1 | 4/2001 | Hungerford ................. 360/221 |
| 6,219,200 B1 * | 4/2001 | Waki et al. .................. 360/126 |
| 6,252,741 B1 | 6/2001 | Ahn ......................... 360/235.1 |
| 6,366,428 B1 | 4/2002 | Yamanaka et al. ........... 360/126 |
| 6,373,659 B1 * | 4/2002 | Hamaguchi et al. ..... 360/234.3 |
| 6,441,994 B1 | 8/2002 | Wang et al. ................. 360/123 |
| 6,473,265 B1 * | 10/2002 | Zhou et al. .................. 360/126 |
| 6,477,007 B1 * | 11/2002 | Shukh et al. ................ 360/126 |
| 6,661,605 B1 * | 12/2003 | Pust et al. ................... 360/126 |
| 2002/0006018 A1 | 1/2002 | Narumi et al. .............. 360/314 |

OTHER PUBLICATIONS

R.M. Bozorth, Ferromagnetism, *IEEE Press*.
H. Masumoto, 'On the Thermal Expansion of the Alloys of Iron, Nickel, and cobalt and the Cause of the Small Expansibility of Alloys of the Invar Type', *Science Reports of the Tohoku Imperial University*, vol. XX, 1931.

* cited by examiner

*Primary Examiner*—Brian E. Miller
(74) *Attorney, Agent, or Firm*—Kinney & Lange, P.A.

(57) ABSTRACT

A magnetic head has an air bearing surface, a substrate, a data transducer and a composite overcoat layer. The data transducer is positioned upon the substrate adjacent the air bearing surface. The data transducer includes a plurality of metallic layers. The composite overcoat layer is positioned upon the data transducer on a side of the data transducer opposite the substrate. An effective coefficient of thermal expansion of the composite overcoat layer is substantially equal to a coefficient of thermal expansion of a material forming the substrate.

20 Claims, 5 Drawing Sheets

OPTIMIZATION OF TEMPERATURE DEPENDENT VARIATIONS IN SHIELD AND POLE RECESSION/PROTRUSION THROUGH USE OF A COMPOSITE OVERCOAT LAYER

CROSS-REFERENCE TO RELATED APPLICATION(S)

This application claims priority from provisional U.S. patent application 60/230,401, filed on Sep. 6, 2000 for "Optimization of Temperature Dependent Variations of Shield and Pole Recession/Protrusion Using Patterned Overcoat Layer" of Moshe Olim and Ladislav R. Pust.

BACKGROUND OF THE INVENTION

The present invention relates generally to the field of magnetic data storage and retrieval systems. In particular, the present invention relates to a thin film transducing head having improved performance due to a reduced thermal pole-tip recession.

In a magnetic data storage and retrieval system, a thin film transducing head typically includes a transducer, a substrate upon which the transducer is built, and an overcoat deposited over the transducer. The transducer, which typically includes a writer portion for recording magnetically-encoded information on a magnetic media and a reader portion for retrieving that magnetically-encoded information from the magnetic media, is formed of multiple layers successively stacked upon the substrate. The volume of the transducer is typically much smaller than both the volume of the substrate and the volume of the overcoat.

The layers of the transducer, which include both metallic and insulating layers, all have differing mechanical and chemical properties than the substrate. These differences in properties affect several aspects of the transducer. First, the layers of the transducing head will be lapped at different rates. Thus, when an air bearing surface (ABS) of the transducing head is lapped during its fabrication, differing amounts of the layers will be removed—resulting in the transducing head having an uneven ABS. Commonly, a greater amount of the metallic layers of the transducer will be removed during the lapping process than will be removed from the substrate. Thus, this lapping process results in a Pole Tip Recession (PTR) of the metallic layers of the transducer with respect to the substrate. The PTR of a particular layer is defined as the distance between the air bearing surface of the substrate and the air bearing surface of that layer.

The differing mechanical and chemical properties of the substrate and transducer layers further affect the air bearing surface during operation of the transducing head. As the magnetic data storage and retrieval system is operated, the transducing head is subjected to increasing temperatures within the magnetic data storage and retrieval system. In addition, a temperature of the transducing head itself, or a part thereof, may be significantly higher than the temperature within the magnetic data storage and retrieval system due to heat dissipation caused by electrical currents in the transducer.

The coefficient of thermal expansion (CTE) of materials used in forming the substrate is typically much smaller than the CTE of materials used in forming the metallic layers of the transducer. Due to the larger CTE of the transducer's metallic layers, those layers will tend to expand a greater amount in response to high temperatures than will the substrate. Thus, when the transducing head is subjected to higher operating temperatures, the metallic layers tend to protrude closer to the magnetic disc than the substrate, thereby affecting the PTR of the transducer. This change in PTR caused by temperature is referred to as the Thermal PTR (T-PTR).

During operation of the magnetic data storage and retrieval system, the transducing head is positioned in close proximity to the magnetic media. A distance between the transducer and the media is preferably small enough to allow for writing to and reading from the magnetic medium with a large areal density, and great enough to prevent contact between the magnetic media and the transducer. Performance of the transducer depends primarily on this distance.

To keep the distance between the transducing head and the magnetic media constant, PTR should not change significantly with temperature. If T-PTR is large, then the spacing between the transducer and the medium will change significantly with temperature, thereby requiring that the low-temperature fly height be high enough to accommodate this variation at higher operating temperatures. On the other hand, if T-PTR is close to zero, the low-temperature fly height can be reduced.

Commonly assigned and co-pending provisional Application No. 60/221,549, entitled "Design and Process of Making Planarized Insulating Layers with Low Thermal Expansion Using Planarization of Material with Larger Thermal Expansion", filed on Jul. 28, 2000, discloses an improved transducing head having low-CTE insulating layers positioned substantially coplanar to at least one of a plurality of metallic layers of the transducing head to reduce T-PTR in the transducing head.

In addition to coplanarly positioning low-CTE insulating layers as disclosed in provisional Application No. 60/221, 549, further improvements are desirable to reduce T-PTR and thereby allow smaller fly heights.

BRIEF SUMMARY OF THE INVENTION

A magnetic head has an air bearing surface, a substrate, a data transducer and a composite overcoat layer. The data transducer is positioned upon the substrate adjacent the air bearing surface. The data transducer includes a plurality of metallic layers. The composite overcoat layer is positioned upon the data transducer on a side of the data transducer opposite the substrate. An effective coefficient of thermal expansion of the composite overcoat layer is substantially equal to a coefficient of thermal expansion of a material forming the substrate.

DETAILED DESCRIPTION

Figure 1:
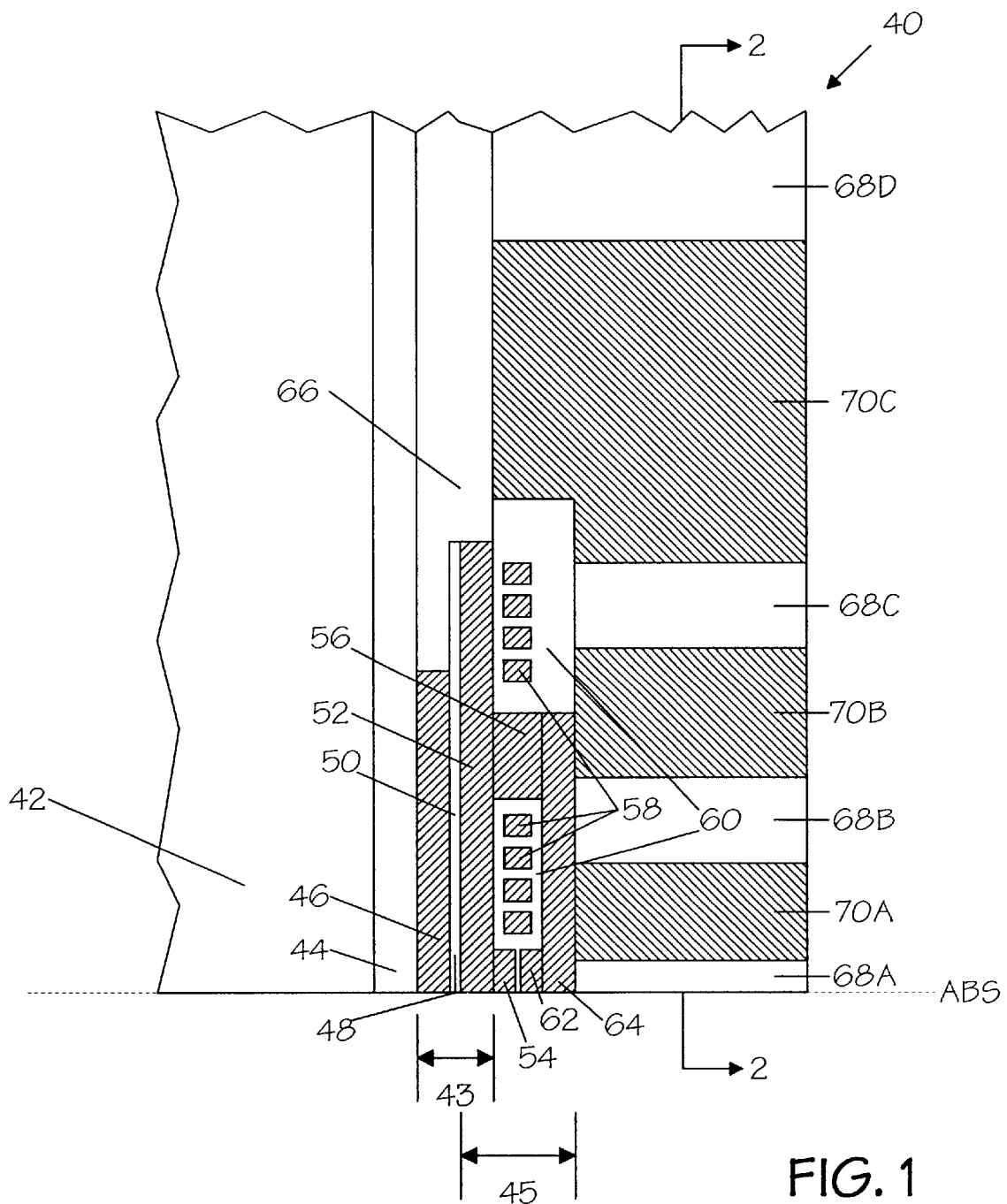
FIG. 1 is a partial cross-sectional view of a transducing head in accord with the present invention.

FIG. 1 is a partial cross-sectional view of transducing head 40 in accord with the present invention. The cross-section of FIG. 1 is taken substantially normal to an air bearing surface (ABS) of transducing head 40.

Transducing head 40 includes substrate 42; basecoat 44; reader 43 (which includes bottom shield 46, read element 48, read gap 50 and shared pole 52); writer 45 (which includes shared pole 52, bottom pole tip 54, back via 56, conductive coil 58, coil insulator 60, top pole tip 62 and top pole 64); insulating layers 66, first overcoat 68A, 68B, 68C, and 68D (collectively referred to as first overcoat 68); and second overcoat 70A, 70B, and 70C (collectively referred to as second overcoat 70).

Basecoat 44 is deposited on substrate 42. Reader 43 and writer 45 are each multi-layer devices which are stacked upon basecoat 44 adjacent the ABS of transducing head 40. As shown in FIG. 1, reader 43 is formed on basecoat 44, and writer 45 is both stacked on and merged with reader 43. In other embodiments not illustrated, reader 43 and writer 45 may be arranged in a piggyback configuration (in which layers are not shared between the two elements) and/or writer 45 may be formed on basecoat 44 (with reader 43 being formed on writer 45). Co-planarly positioned with the layers of reader 43 and writer 45, and opposite the ABS of transducing head 40, is insulating layer 66. First overcoat 68 and second overcoat 70 form a composite overcoat layer on writer 45 and on insulating layer 66, such that second overcoat 70 is interspersed between first overcoat 68.

Substrate 42 is typically formed of an electrically-conductive, ceramic material such as AlTiC, TiC, Si, SiC, $Al_2O_3$, AlSiC or other composite materials formed of combinations of these materials. Of these materials, AlTiC and TiC have relatively large coefficients of thermal expansion (CTE), typically in the range of about $7.0 \times 10^{-6}/°$ C. to about $8.3 \times 10^{-6}/°$ C., while silicon has a lower CTE, in the range of about $2.3 \times 10^{-6}/°$ C. to about $3.0 \times 10^{-6}/°$ C.

Insulating basecoat 44 is formed on substrate 42. Basecoat 44 is generally formed of an insulating material, such as $Al_2O_3$, AlN, $SiO_2$, $Si_3N_4$, or $SiO_{0-2}N_{0-1.5}$. Generally, the insulating material for basecoat 44 is selected to most closely match the chemical and mechanical properties of the material used as substrate 42. For example, an $Al_2O_3$ basecoat 44 is commonly used in conjunction with an AlTiC substrate 42, since the two materials have similar CTEs.

Reader 43 is formed on basecoat 44, and includes bottom shield 46, read element 48, read gap 50 and shared pole 52. A read gap is defined on the ABS between terminating ends of bottom shield 46 and shared pole 52. Read element 48 is positioned in the read gap adjacent the ABS. Read gap 50 insulates read element 48 from bottom shield 46 and shared pole 52. Read element 48 may be any of a variety of different types of read elements, such as an anisotropic magnetoresistive (MR) read element or a giant magnetoresistive (GMR) read element. In operation, magnetic flux from a surface of a magnetic media causes rotation of a magnetization vector of MR read element 48, which in turn causes a change in electrical resistivity of MR read element 48. The change in resistivity of read element 48 can be detected by passing a current through read element 48 and measuring a voltage across read element 48.

Writer 45 is formed on reader 43, and includes shared pole 52, bottom pole tip 54, back via 56, conductive coil 58, coil insulator 60, top pole tip 62 and top pole 64. Bottom pole tip 54 and back via 56 are formed on shared pole 52, with bottom pole tip 54 being positioned adjacent the ABS and back via 56 being spaced away from the ABS. A write gap is defined on the ABS between bottom pole tip 54 and top pole tip 62. Top pole 64 is formed over top pole tip 62 and extends from the ABS to back via 56. Conductive coil 58 is positioned in coil insulator 60 between shared pole 52 and top pole 64, wrapping around back via 56, such that the flow of electrical current through conductive coil 58 generates a magnetic field across the write gap.

Transducing head 40 is a merged-head configuration in which shared pole 52 serves as a top shield for reader 43 and a bottom pole for writer 45. Although not illustrated, transducing head 40 may also be arranged in a piggy-back configuration in which the top shield of reader 43 and the bottom pole of writer 45 are made of separate layers, or in a merged-head configuration in which reader 43 is built upon writer 45.

Each of bottom shield 46, shared pole 52, bottom pole tip 54, back via 56, top pole tip 62 and top pole 64 are formed of metallic materials. Preferably, each of these components is formed of an alloy primarily composed of Fe, Ni and/or Co. Such metallic alloys typically have large CTEs. For example, $Ni_{79}Fe_{21}$ has a CTE of about $12.2 \times 10^{-6}/°$ C.

Read gap 50 is generally formed of an insulating material such as $Al_2O_3$. Coil 58 is generally formed of an electrically-conductive metal such as copper, gold or silver. Most commonly used is copper, which has a CTE of about $16.5 \times 10^{-6}/°$ C. Coil insulator 60 is generally formed from a cured photoresist having a large CTE, or from other insulating materials, such as AlN, $SiO_2$, and $Si_3N_4$.

Not shown in FIG. 1 are electrical leads and contacts to read element 48 and coil 58. The electrical leads and contacts are typically formed of metals, such as copper, gold or silver, or metallic alloys.

Insulating layer 66 is positioned in-plane with layers of reader 43 and writer 45 of transducing head 40, opposite the ABS. Insulating layer 66 is preferably formed of an insulating material, Such as $Al_2O_3$, AlN, $SiO_2$, $Si_3N_4$ and $SiO_{0-2}N_{0-1.5}$. The following table identifies several common insulating materials and their properties. The exact values in the table may vary depending upon processing and manufacturing considerations.

| Material | CTE [$10^{-6}/°$ C.] | Young's Modulus [GPa] | Poisson's Ratio [1] |
|---|---|---|---|
| AlTiC | 7.9 | 380 | .22 |
| $Al_2O_3$ | 7.8 | 200 | .25 |
| Si | 2.6 | 163 | .22 |
| $Si_3N_4$ | 3.0 | 200 | .25 |
| AlN | 4.3 | 220 | .25 |
| SiC | 4.5 | 410 | .18 |
| $SiO_2$ | 1.0 | 58 | .25 |

Alternatively, insulating layer 66 may be formed of multi-layers as disclosed in provisional Application No. 60/221,541, which is hereby incorporated by reference as if set forth fully herein.

First and second overcoats 68 and 70 are patterned into a composite overcoat layer positioned over top pole 64, exposed coil insulator 60 and insulating layer 66, such that first and second overcoats 68 and 70 are alternated along the height of transducing head 40 (i.e., normal to the ABS). As shown in FIG: 1, first overcoat 68A is positioned adjacent the ABS, while second overcoat 70A is positioned adjacent first overcoat 68A opposite the ABS. Successively positioned adjacent second overcoat 70A opposite first overcoat 68A are first overcoat 68B, second overcoat 70B, first overcoat 68C, second overcoat 70C and first overcoat 68D.

First and second overcoats 68 and 70 are typically formed of insulating materials such as AlTiC, $Al_2O_3$, Si, $Si_3N_4$, AlN, SiC and $SiO_2$. Preferably, one of first and second overcoats 68 and 70 is formed of an insulating material having a coefficient of thermal expansion (CTE) about the same or slightly greater than that of the material forming the substrate, while the other is formed of an insulating material having a CTE less than that of the material forming the substrate. The composite overcoat layer can be formed by a number of different manufacturing processes, such as a damascene process or an etch and fill process.

The layers of transducing head 40 all have differing mechanical and chemical properties. Due to these differing properties, the layers of transducing head 40 will be lapped at different rates. Thus, the lapping of the ABS of transducing head 40 during fabrication results in transducing head 40 having an uneven ABS. Commonly, a greater amount of the metallic layers of transducing head 40 will be removed during the lapping process than will be removed from substrate 42, resulting in a Pole Tip Recession (PTR) of the metallic layers with respect to substrate 42. The PTR of a particular layer is defined as the distance between the air bearing surface of substrate 42 and the air bearing surface of that layer.

The differing mechanical and chemical properties of the layers of transducing head 40 further affect the air bearing surface of transducing head 40 during operation thereof. The coefficient of thermal expansion (CTE) of materials used in forming substrate 42 is typically much smaller than the CTE of materials used in forming the metallic layers of transducing head 40. Due to the larger CTE of the metallic layers, those layers will tend to expand a greater amount than will substrate 42. Thus, when transducing head 40 is subjected to higher operating temperatures, the metallic layers tend to protrude closer to the magnetic disc than substrate 42; thereby affecting the PTR of the metallic layers of transducing head 40. This change in PTR caused by temperature is referred to as the Thermal PTR (T-PTR).

The present invention addresses the problem of T-PTR by using first and second overcoats 68 and 70 to compensate for the high CTE of the metallic layers of transducing head 40. By using a material for first overcoat 68 which has a CTE substantially the same (or slightly greater than) that of the material used for substrate 42 and a material for second overcoat 70 which has a CTE lower than that of the material used for substrate 42, the composite overcoat layer formed of first overcoat 68 and second overcoat 70 will expand less than substrate 42. By effectively shrinking with respect to substrate 42, the composite overcoat layer will pull the metallic layers of transducing head 40 away from the ABS, thus reducing the T-PTR of transducing head 40. The composite overcoat layer can be formed by a number of different manufacturing processes, such as a damascene process or an etch and fill process.

By appropriately selecting the materials for, as well as the size and shape of, first and second overcoats 68 and 70, the composite overcoat layer can compensate for the larger thermal expansion of the metallic layers. Preferably, the T-PTR will remain close to zero, thereby enabling a lower fly height to enhance the performance of transducing head 40.

Figure 2:
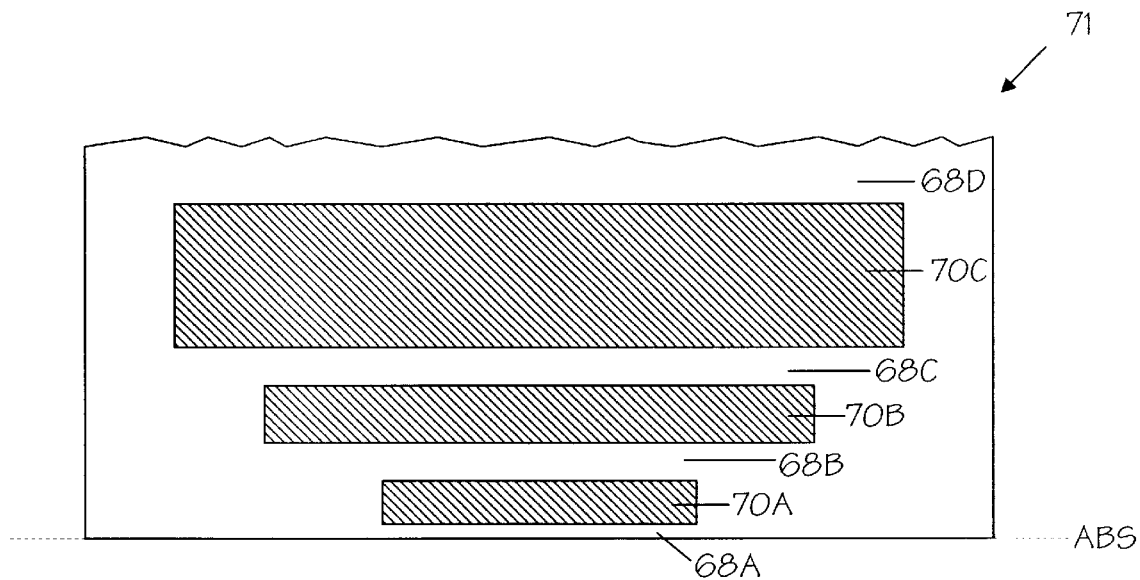
FIG. 2 is a view of cross-section 2—2 of the transducing head of FIG. 1, illustrating a composite overcoat in accord with the present invention.

FIG. 2 is a view of cross-section 2—2 of FIG. 1. Cross-section 2—2 is of composite overcoat layer 71 formed of first overcoat 68 with second overcoat 70 embedded as varying-sized blocks therein. The particular size, shape and thickness of each block of second overcoat 68 should be selected such that the thermal expansion of composite overcoat layer 71 compensates for the greater expansion of the metallic layers of transducing head 40.

Many low-CTE materials are not well suited to several manufacturing processes, such as lapping. Thus, second overcoat 70, formed of a low-CTE material, can be patterned to not extend across any lapping lines, while first overcoat 68 is formed of a material better suited to lapping. For example, for substrate 42 formed of Si, a suitable material for second overcoat 70 (one having a CTE lower than Si) might be $SiO_2$. However, $SiO_2$ is very challenging to lap. By ensuring that second overcoat 70 does not cross the lap line, and that first overcoat 68 is formed of a material amenable to lapping, it is possible to achieve low T-PTR without the need to lap $SiO_2$.

If the two materials forming first and second overcoats 68 and 70 are both well manufacturable, both first and second overcoats 68 and 70 may extend across the lapping lines.

Figure 3:
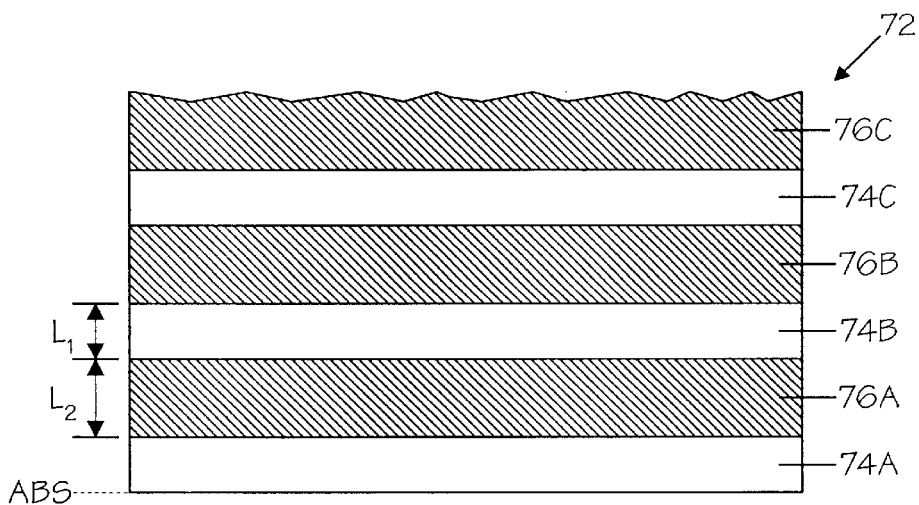
FIG. 3 is a cross-sectional view of a composite overcoat layer in accord with the present invention.

FIG. 3 is a cross-sectional view of composite overcoat layer 72 in accord with the present invention. Composite overcoat layer 72 is an alternate embodiment of composite overcoat layer 71 formed of first overcoat 68 and second overcoat 70 of FIGS. 1 and 2. Composite overcoat layer 72 is formed of alternating blocks of first overcoat 74 (illustrated as first overcoat 74A, 74B and 74C) and second overcoat 76 (illustrated as first overcoat 76A, 76B and 76C). Each block of first overcoat 74 has a length $L_1$ and each block of second overcoat 76 has a length $L_2$.

The greater thermal expansion of a plurality of metallic layers of a transducing head can be compensated by equating a thermal expansion of composite overcoat layer 72 to a thermal expansion of a substrate of the transducing head. In the embodiment illustrated in FIG. 3, the thermal expansion of composite overcoat layer 72 will substantially equal the thermal expansion of the substrate when the following condition is met:

$$\alpha'_1 L'_1 + \alpha'_2 L'_2 = 1,$$

where $$\alpha'_i = \alpha_i / \alpha_{substrate}$$

and $$L'_i = L_i / (L_1 + L_2), \text{ for } i=1, 2.$$

In the above equations, $\alpha_1$ represents the coefficient of thermal expansion of first overcoat 74 and $\alpha_2$ represents the coefficient of thermal expansion of second overcoat 76.

The present invention contemplates that a composite overcoat layer in accord with the present invention may be formed of varying sized and shaped blocks of two or more insulating materials. It is further contemplated that a basecoat of the transducing head could similarly be patterned of two or more insulating materials to help compensate for the thermal expansion of the transducing head's metallic layers.

Figure 4:
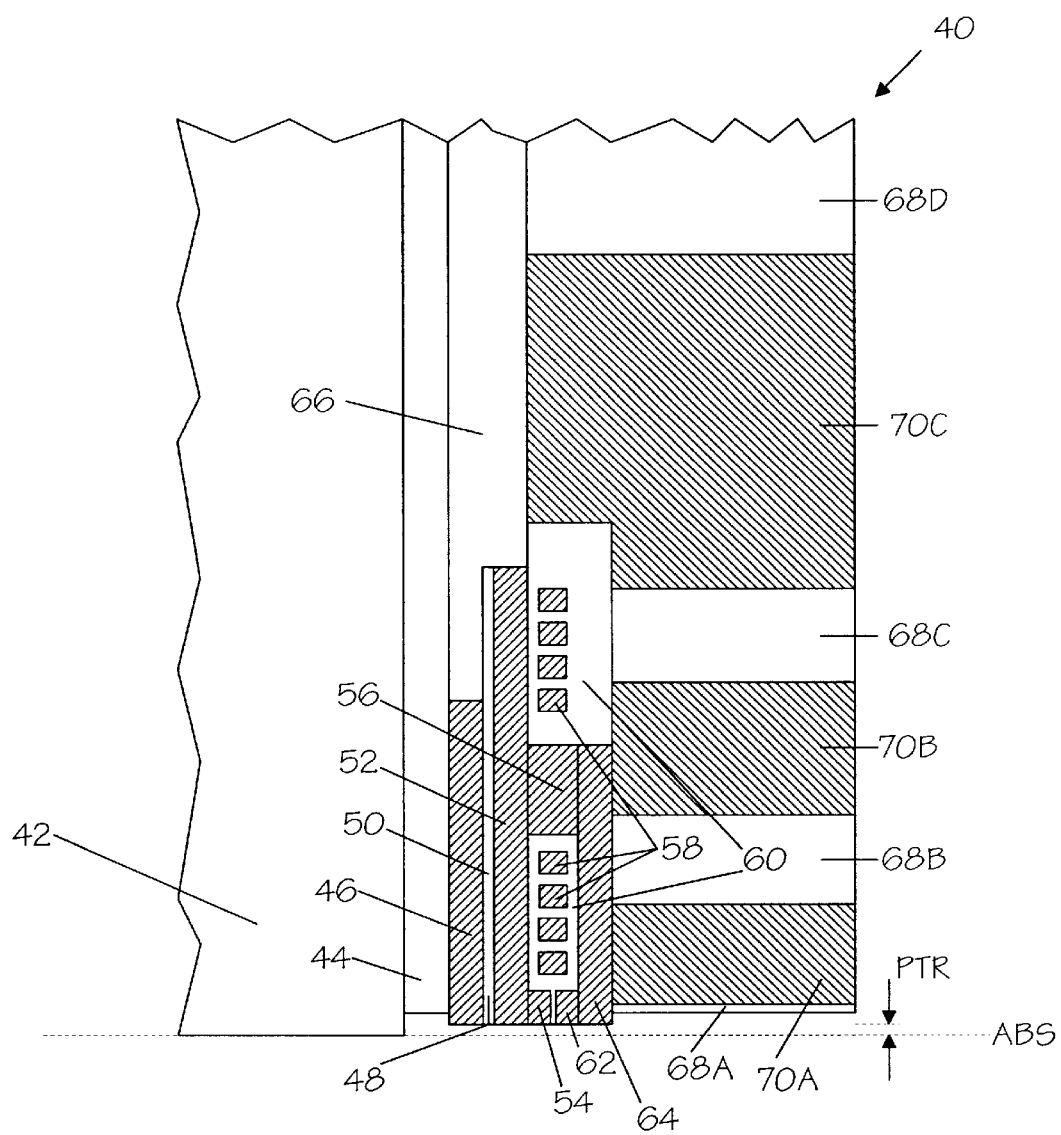
FIG. 4 is a cross-sectional view of the transducing head of FIG. 1 illustrating the concept of Pole Tip Recession.

FIGS. 4–7 illustrate the concepts of PTR and T-PTR, and their effect on the performance of a transducing head. FIG. 4 is a cross-sectional view of transducing head 40 for illustrating the concept of PTR. As shown in FIG. 4, transducing head 40 is essentially formed of substrate 42, read element 48, a plurality of insulating layers (which include basecoat 44, read gap 50, coil insulator 60, insulating layers 66, insulating layers 67 and overcoat 68) and a plurality of metallic layers (which include bottom shield 46, shared pole 52, bottom pole tip 54, back via 56, conductive coil 58, top pole tip 62 and top pole 64).

As described above with reference to FIG. 1, the insulating layers and metallic layers of transducing head 40 have differing mechanical and chemical properties than substrate 42. These differences in properties cause substrate 42, the insulating layers and the metallic layers to each be lapped at different rates. Thus, the lapping of the ABS of transducing head 40 during fabrication causes transducing head 40 to have an uneven ABS. Commonly, a greater amount of the insulating layers will be removed during the lapping process than will be removed from the metallic layers. Similarly, a greater amount of the metallic layers will be removed during the lapping process than will be removed from substrate 42. Thus, the lapping process results in a recession from the ABS of the insulating layers and the metallic layers of transducing head 40 with respect to substrate 42. The PTR of a particular layer is defined as the distance between the ABS of substrate 42 and the ABS of that layer. For clarity, the magnitude of pole tip recession is exaggerated in FIG. 4.

Figure 5A:
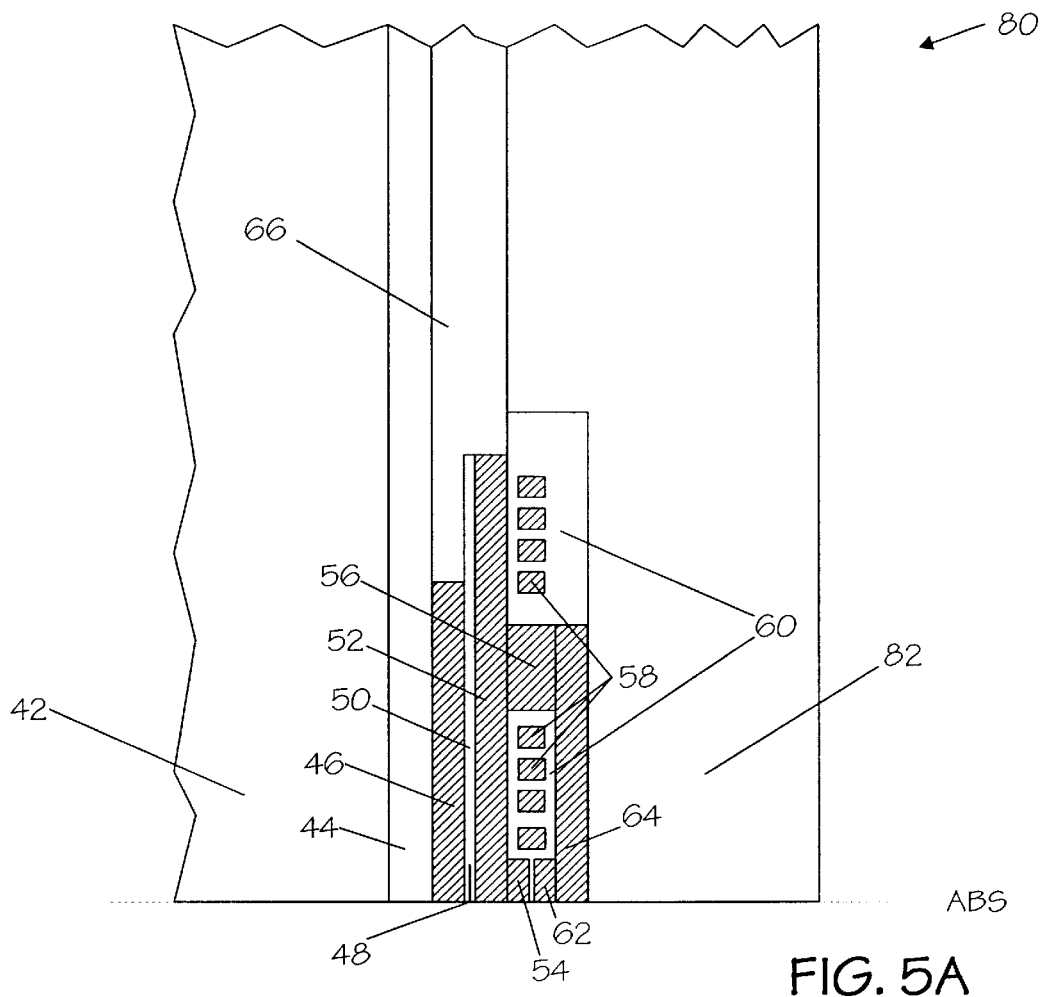
FIG. 5A is a cross-sectional view of a transducing head illustrating the concept of Thermal Pole Tip Recession.
Figure 5B:
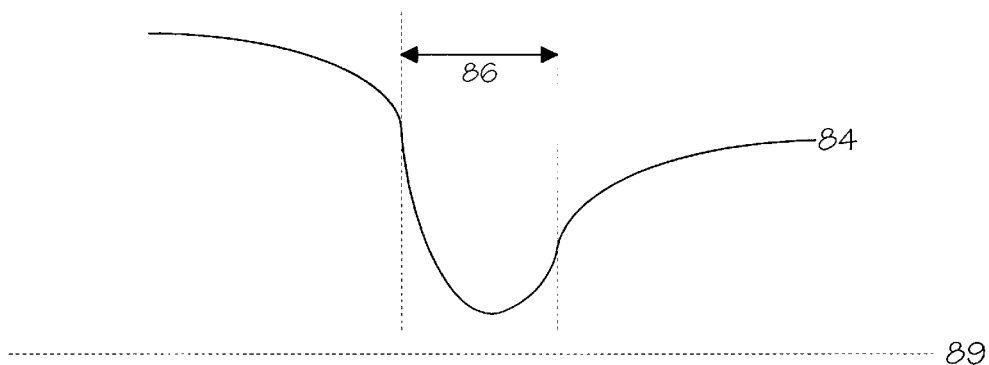
FIG. 5B represents an exaggerated profile of an air bearing surface of the transducing head of FIG. 5A.

FIGS. 5A and 5B illustrate the concept of Thermal Pole Tip Recession on transducing head 80. FIG. 5A is a cross-sectional view of transducing head 80, which is substantially similar to transducing head 40 of FIG. 1, with the exception that first and second overcoats 68 and 70 of transducing head 40 are replaced with overcoat 82. For that reason, similar elements of FIGS. 1 and 5A are numbered identically. Transducing head 80 is essentially formed of substrate 42, read element 48, a plurality of insulating layers (which include basecoat 44, read gap 50 and coil insulator 60, insulating layer 66, overcoat 82 and a plurality of metallic layers (which include bottom shield 46, shared pole 52, bottom pole tip 54, back via 56, conductive coil 58, top pole tip 62 and top pole 64). The configuration of the various layers of transducing head 80 is identical to those of transducing head 40 of FIG. 1, except that overcoat 82 is formed of one material.

The differing mechanical and chemical properties of the layers of transducing head 80 affect the ABS during its operation. As transducing head 80 is operated, it is subjected to increasing temperatures. In addition, a temperature of transducing head 80, or a part thereof, may be significantly greater than the temperature within the magnetic data storage and retrieval system in which transducing head 80 resides due to heat dissipation caused by electrical currents therein.

The coefficient of thermal expansion (CTE) of materials used in forming substrate 42 is typically much smaller than the CTE of materials used in forming the insulating layers and the metallic layers. Due to their larger CTE, the metallic layers will tend to expand a greater amount than will substrate 42. Thus, when transducing head 80 is subjected to higher operating temperatures, the metallic layers tend to protrude closer to the magnetic disc than substrate 42, thereby affecting the PTR of the metallic layers. This change in PTR caused by temperature is referred to as the Thermal PTR (T-PTR).

The actual amount of T-PTR at a given temperature higher than the ambient temperature is determined by the interplay of the CTE, Young Modulus and Poisson's Ratio of all the materials used in forming transducing head 80. Examples of these values are given in the following table:

| Material | CTE [$10^{-6}/°$ C.] | Young's Modulus [GPa] | Poisson's Ratio [1] |
| --- | --- | --- | --- |
| AlTiC | 7.9 | 380 | .22 |
| Aluminum Oxide | 7.8 | 200 | .25 |

-continued

| Material | CTE [$10^{-6}/°$ C.] | Young's Modulus [GPa] | Poisson's Ratio [1] |
| --- | --- | --- | --- |
| NiFe | 12.2 | 207 | .30 |
| Cu | 16.5 | 117 | .33 |
| Photoresist | 51 | 7 | .40 |

The exact values included in the above table may vary, as they depend upon the particular manufacturing and processing of the material.

FIG. 5B represents an exaggerated profile 84 which illustrates how the greater expansion of the metallic layers over substrate 42 causes the metallic layers in region 86 to come in closer proximity to disc surface 89.

Figure 6:
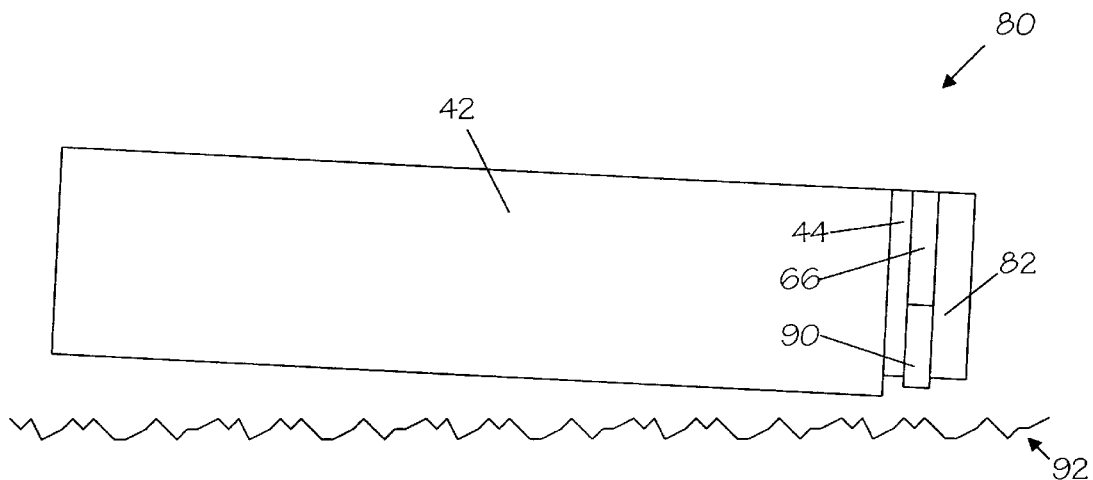
FIGS. 6 and 7 illustrate the effect on the fly height of the transducing head of FIG. 5A caused by Thermal Pole Tip Recession.
Figure 7:
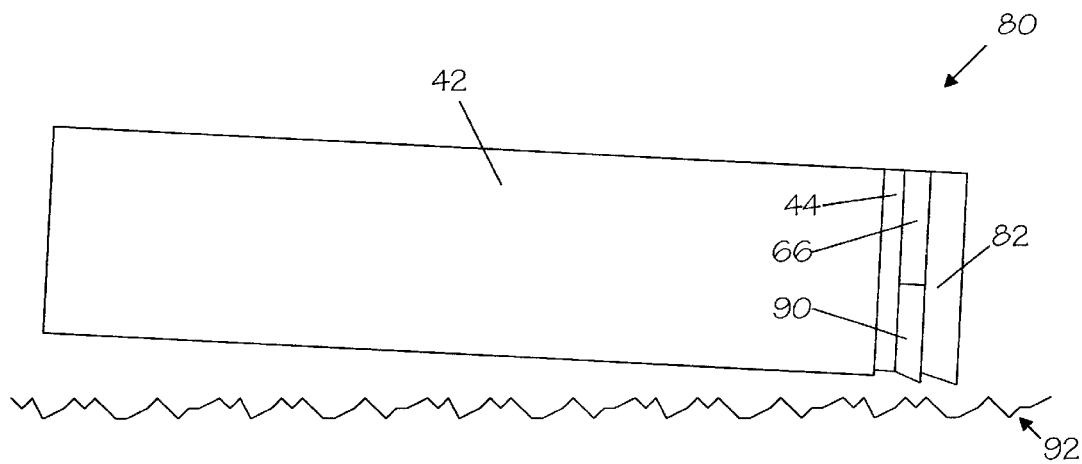

FIGS. 6 and 7 illustrate the effect caused by T-PTR on the fly height of transducing head 80. During operation of a magnetic data storage and retrieval system, transducing head 80 is positioned in close proximity to magnetic media 92. A distance between transducer 90 (formed of reader 43 and writer 45) and media 92 is preferably small enough to allow for writing to and reading from a magnetic medium having a large areal density, and great enough to prevent contact between magnetic media 92 and transducer 90. Performance of transducer 90 depends primarily on this distance. The fly height is primarily determined by the shape of the ABS of the slider upon which transducing head 80 is mounted.

To keep the distance between transducer 90 and magnetic media 92 constant, PTR should not change significantly with temperature. If T-PTR is large, then the spacing between transducer 90 and media 92 will change significantly with temperature, thereby requiring that the low-temperature fly height be high enough to accommodate this variation at higher operating temperatures. On the other hand, if T-PTR is close to zero, the low-temperature fly height can be reduced.

FIG. 6 is a cross-sectional view of transducing head 80 flying above magnetic media 92 at low operating temperatures. At these temperatures, thermal expansion of the layers of transducing head 80 does not affect the performance thereof. As described with reference to FIG. 4, an ABS of transducer 90 (formed of reader 43 and writer 45) is recessed from the ABS of substrate 42, and an ABS of basecoat 44 and overcoat 82 are recessed an even greater amount. For clarity, the magnitude of pole tip recession is exaggerated in FIG. 6.

FIG. 7 is a cross-sectional view of transducing head 80 flying above magnetic media 92 at high operating temperatures. At these higher temperatures, basecoat 44, overcoat 82 (which does not incorporate low CTE materials as shown in FIG. 1), insulating layer 66 and transducer 90 all expand a greater amount than substrate 42, with transducer 90 expanding the greatest amount. These expansions are caused by the relatively higher CTEs of these layers over that of substrate 42. As shown in FIG. 7, transducer 90 protrudes closer to magnetic media 92 than substrate 42, allowing for a greater likelihood of contact between transducer 90 and magnetic media 92. For clarity, the magnitude of thermal pole tip recession is exaggerated in FIG. 7.

In conclusion, the present invention minimizes the problem of thermal Pole Tip Recession in a transducing head. By selectively forming a composite overcoat layer of a transducing head of two or more insulating materials to compensate for the thermal expansion of the transducing head's metallic layers, T-PTR of the transducing head can be reduced. By minimizing T-PTR, the transducing head can be maintained at a lower fly height without risk of contact between the transducing head and the magnetic media. Thus, the present invention greatly improves the performance of the transducing head.

Although the present invention has been described with reference to preferred embodiments, workers skilled in the art will recognize that changes may be made in form and detail without departing from the spirit and scope of the invention.

What is claimed is:

1. A magnetic data storage and retrieval system comprising:

a magnetic head having an air bearing surface and a height measured substantially normal to the air bearing surface, the magnetic head having a substrate and a data transducer positioned upon the substrate, the data transducer comprising at least one metallic layer formed of a material having a coefficient of thermal expansion greater than a coefficient of thermal expansion of a material forming the substrate; and a composite overcoat layer positioned upon the data transducer on a side of the data transducer opposite the substrate, the overcoat layer being a single layer patterned from a first material and a second material such that blocks of the first and second materials alternate along the height of the magnetic head, the first material having a coefficient of thermal expansion substantially equal to or greater than a coefficient of thermal expansion of the material forming the substrate and the second material having a coefficient of thermal expansion less than the coefficient of thermal expansion of the material forming the substrate.

2. The magnetic data storage and retrieval system of claim 1 wherein the first and second materials are insulating materials.

3. The magnetic data storage and retrieval system of claim 2 wherein the insulating materials are selected from the group consisting of $Si_3N_4$, AlN, SiC, $SiO_2$ and $SiO_{0-2}N_{0-1.5}$.

4. The magnetic data storage and retrieval system of claim 1 wherein an effective coefficient of thermal expansion of the composite overcoat layer is substantially equal to a coefficient of thermal expansion of the material forming the substrate.

5. A magnetic head having an air bearing surface and a height measured substantially normal to air bearing surface the magnetic head comprising:

a substrate;

a data transducer positioned upon the substrate adjacent the air bearing surface, the data transducer comprising a plurality of metallic layers; and a composite overcoat layer positioned upon the data transducer on a side of the data transducer opposite the substrate, wherein an effective coefficient of thermal expansion of the composite overcoat layer is substantially equal to a coefficient of thermal expansion of a material forming the substrate, wherein the composite overcoat layer is patterned from blocks of at least two overcoat materials positioned such that the blocks are distributed along the height of the data transducer.

6. The magnetic head of claim 5 wherein the composite overcoat layer is formed of at least two distinct insulating materials.

7. The magnetic head of claim 5 wherein the overcoat materials include a first overcoat material having a coefficient of thermal expansion substantially equal to or greater than the coefficient of thermal expansion of the material forming the substrate and a second overcoat material having a coefficient of thermal expansion less than the coefficient of thermal expansion of the material forming the substrate.

8. The magnetic head of claim 7 wherein the substrate is formed of a material selected from the group consisting of AlTiC and AlSiC.

9. The magnetic head of claim 8 wherein the first overcoat material is $Al_2O_3$.

10. The magnetic head of claim 8 wherein the second overcoat material is selected from the group consisting of $Si_3N_4$, AlN, SiC, $SiO_2$ and $SiO_{0-2}N_{0-1.5}$.

11. The magnetic head of claim 7 wherein the substrate is formed of a material selected from the group consisting of Si and SiC.

12. The magnetic head of claim 11 wherein the first overcoat material is selected from the group consisting of $Si_3N_4$, AlN, SiC, and $SiO_{0-2}N_{0-1.5}$.

13. The magnetic head of claim 11 wherein the second overcoat material is $SiO_2$.

14. The magnetic head of claim 5 wherein the data transducer comprises:

a bottom shield;

a top shield;

a read element positioned adjacent the air bearing surface between the bottom and top shields; and a read gap insulator positioned between the bottom and top shields for insulating the read element therefrom.

15. The magnetic head of claim 5 wherein the data transducer comprises:

a bottom pole;

a top pole separated from the bottom pole at the air bearing surface by a write gap and in contact with the bottom pole opposite the air bearing surface;

a conductive coil arranged such that at least a portion of the conductive coil is positioned between the bottom and top poles; and a coil insulator positioned between the bottom and top poles for insulating the conductive coil therefrom.

16. The magnetic head of claim 5 wherein the data transducer comprises:

a bottom shield;

a shared pole;

a read element positioned adjacent the air bearing surface between the bottom shield and the shared pole;

a read gap insulator positioned between the bottom shield and the shared pole for insulating the read element therefrom;

a top pole separated from the shared pole at the air bearing surface by a write gap and in contact with the shared pole opposite the air bearing surface;

a conductive coil arranged such that at least a portion of the conductive coil is positioned between the shared and top poles; and a coil insulator positioned between the shared and top poles for insulating the conductive coil therefrom.

17. A magnetic head having an air bearing surface and a height measured substantially normal to the air bearing surface the magnetic head comprising:

a substrate;

a data transducer positioned upon the substrate adjacent the air bearing surface, the data transducer comprising a plurality of metallic layers; and a composite overcoat layer positioned upon the data transducer on a side of the data transducer opposite the substrate, the composite overcoat layer comprising a first overcoat material having a coefficient of thermal expansion substantially equal to or greater than a coefficient of thermal expansion of a material forming the substrate and a second overcoat material having a coefficient of thermal expansion less than the coefficient of thermal expansion of the material forming the substrate, the composite overcoat layer being patterned with blocks of the second overcoat material being embedded within the first overcoat material such that the blocks of the second overcoat material are distributed along the height of the data transducer and so that an effective coefficient of thermal expansion of the composite overcoat layer is substantially equal to the coefficient of thermal expansion of the material forming the substrate.

18. The magnetic head of claim 17 wherein the substrate is formed of a material selected from the group consisting of AlTiC, AlSiC, Si and SiC.

19. The magnetic head of claim 17 wherein the first overcoat is formed of a material selected from the group consisting of $Al_2O_3$, $Si_3N_4$, AlN, SiC, $SiO_2$, and $SiO_{0-2}N_{0-1.5}$.

20. The magnetic head of claim 17 wherein the second overcoat is formed of an insulating material selected from the group consisting of $Al_2O_3$, $Si_3N_4$, AlN, SiC, $SiO_2$ and $SiO_{0-2}N_{0-1.5}$.

* * * * *

UNITED STATES PATENT AND TRADEMARK OFFICE
CERTIFICATE OF CORRECTION

PATENT NO. : 6,747,841 B1
DATED : June 8, 2004
INVENTOR(S) : Moshe Olim et al.

It is certified that error appears in the above-identified patent and that said Letters Patent is hereby corrected as shown below:

Title page,
Item [56], References Cited, U.S. PATENT DOCUMENTS, insert
-- 09/649,958   Shukh et al.
   09/664,270   Shukh et al.
   09/605,080   Shukh --

Column 2,
Line 16, delete "IfT-PTR", insert -- If T-PTR --

Column 4,
Line 64, delete "FIG:", insert -- FIG. --

Column 9,
Line 45, insert -- the --, after "to"

Signed and Sealed this

Twenty-eighth Day of December, 2004

JON W. DUDAS
*Director of the United States Patent and Trademark Office*